United States Patent [19]

Cheng

[11] Patent Number: 4,794,831

[45] Date of Patent: Jan. 3, 1989

[54] METHOD AND APPARATUS FOR AUTOMATICALLY CUTTING WORKPIECES ON A PORTABLE LATHE

[76] Inventor: Fu Cheng, 2nd Fl., No. 48-6, Lane 103, Sec. 2, Nei-Hu Rd., Taipei, Taiwan

[21] Appl. No.: 79,260

[22] Filed: Jul. 29, 1987

[51] Int. Cl.$^4$ .................................................. B23B 13/00
[52] U.S. Cl. ........................................ 82/1 C; 82/2.5; 82/DIG. 5; 198/493
[58] Field of Search .................. 198/493, 495; 82/2.5, 82/2 R, 28 R, 1 C, DIG. 11, DIG. 5; 407/11

[56] References Cited

U.S. PATENT DOCUMENTS

| | | | |
|---|---|---|---|
| 2,856,097 | 10/1959 | McFaul | 198/493 |
| 2,860,761 | 11/1958 | Kocan | 198/493 |
| 3,212,620 | 10/1965 | Adams | 198/493 |
| 4,302,134 | 11/1981 | Johnson | 198/493 |
| 4,404,828 | 9/1983 | Blanchard | 82/2.5 |

FOREIGN PATENT DOCUMENTS 0101284 5/1925 Fed. Rep. of Germany ... 82/DIG. 2

Primary Examiner—Robert P. Olszewski
Assistant Examiner—Blynn Shideler
Attorney, Agent, or Firm—Michael N. Meller

[57] ABSTRACT

A method and apparatus are used for automatically cutting workpieces on a portable lathe. By using the method and apparatus, the machining processes including charging the workpieces into a chuck, holding the workpieces on the chuck, cutting the workpieces with a cutting tool, loosening the workpieces from the chuck, and discharging the workpieces from the chuck are automatically performed under a timing control of a timer. In the method, the workpieces are charged into and discharged from the chuck by blowing the compressed air of a pair of air nozzles respectively onto the opposite ends of the workpieces. The operation of the chuck is controlled by a hydraulic clutch drivable by a hydraulic cylinder.

8 Claims, 3 Drawing Sheets

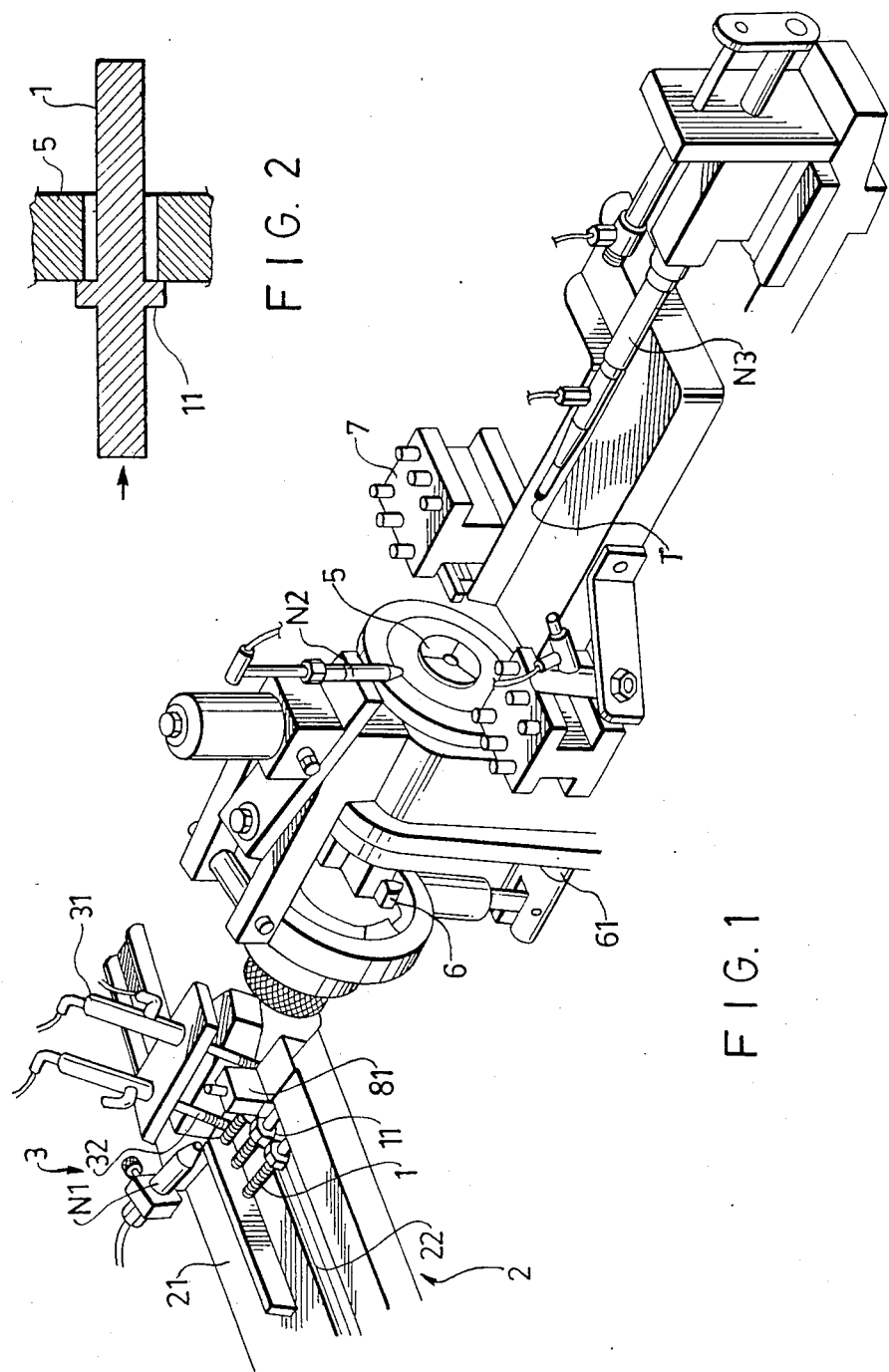

METHOD AND APPARATUS FOR AUTOMATICALLY CUTTING WORKPIECES ON A PORTABLE LATHE

BACKGROUND OF THE INVENTION

The present invention relates to a method and apparatus for cutting workpieces on a portable lathe, and more particularly to an automatically controllable one whereby the workpieces can be pneumatically both charged into a chuck and discharged from the chuck.

As is well known in the art, CNC lathes (computer numerical control lathes) have been developed. But the CNC lathes are only used to shape the workpieces of a large volume. Because the CNC lathes are expensive, they are not normally used to shape the workpieces of a small volume. In a portable lathe for use in cutting the small-volume workpieces, only the feed of the cutting tool can be automatically controlled. Heretofore, the processes of charging the workpieces into a chuck, tightening and loosening the chuck, and discharging the workpieces from the chuck are manually controlled. It is understood that the amount needed of small-volume workpieces is relatively large. In addition, the time required to machine a small-volume workpiece on a portable lathe is very little. To promote the efficiency of machining the small-volume workpieces, the provision of a completely automated portable lathe is required.

SUMMARY OF THE INVENTION

It is therefore the main object of the present invention to provide a method and apparatus for automatically cutting workpieces on a portable lathe.

According to the present invention, the method for automatically cutting workpieces on a portable lathe includes the following steps:

(1) automatically feeding the workpieces to a pneumatic control valve one by one in such a manner that all of the workpieces reach the control valve with the same orientation;

(2) automatically opening the control valve for a predetermined period and subsequently closing said control valve under a timing control so that only one of the workpieces can enter an inlet of a sliding way during the predetermined period;

(3) blowing compressed air from a first air nozzle onto the workpiece which has reached the inlet of the sliding way under the timing control so that the workpiece slides along the sliding way into a chuck while the workpiece is obstructed from forward movement out of the chuck;

(4) automatically holding the workpiece within the chuck under the timing control;

(5) automatically rotating the chuck and hence the workpiece under the timing control;

(6) automatically moving a cutting tool relative to the workpiece to cut the workpiece under the timing control;

(7) automatically blowing compressed air from a second air nozzle onto the workpiece held within the chuck so as to remove chips from the workpiece under the timing control;

(8) automatically loosening the workpiece from the chuck under the timing control;

(9) automatically blowing compressed air from a third air nozzle onto the workpiece under the timing control so that the workpiece slides along the sliding way to an outlet of the sliding way; and

(10) repeating the steps (2) to (9).

To achieve the method of the present invention, the apparatus provided for automatically cutting workpieces on a portable lathe includes:

a chuck;

a sliding way to the chuck, the sliding way having an inlet and an outlet;

a pneumatic control valve installed at the inlet of the sliding way;

a feeder for automatically feeding the workpieces to the pneumatic control valve one by one in such a manner that all of the workpieces reach the pneumatic control valve with the same orientation;

a first air nozzle directed toward the inlet of the sliding way for moving the workpiece along the sliding way into the chuck;

means for obstructing the workpiece within the chuck from forward movement out of the latter;

a second air nozzle directed radially of the workpiece held within and on the chuck for removing chips from the workpiece after the workpiece has been cut;

a third air nozzle directed axially of the workpiece positioned loosely within the chuck for moving the workpiece to the outlet of the sliding way; and a timer for timing control of starting and stopping the operation of the first, second, and third air nozzles, the pneumatic control valve, and the chuck;

thereby, the workpieces can be automatically charged into the chuck, automatically held on the chuck, automatically cut by a cutting tool, automatically loosened from the chuck, and automatically discharged from the chuck to the outlet of the sliding way under the timing control of the timer.

BRIEF DESCRIPTION OF THE DRAWINGS

Other features and advantages of the present invention will become apparent from the following detailed description of a preferred embodiment of the present invention with reference to the accompanying drawings in which:

FIG. 1 is a perspective view of a portable lathe for automatically cutting workpieces each having an outward flange according to the present invention;

FIG. 2 is a schematic view illustrating how the outward flange of the workpiece is obstructed by a chuck;

DETAILED DESCRIPTION OF THE PREFERRED EMBODIMENT

Figure 3:
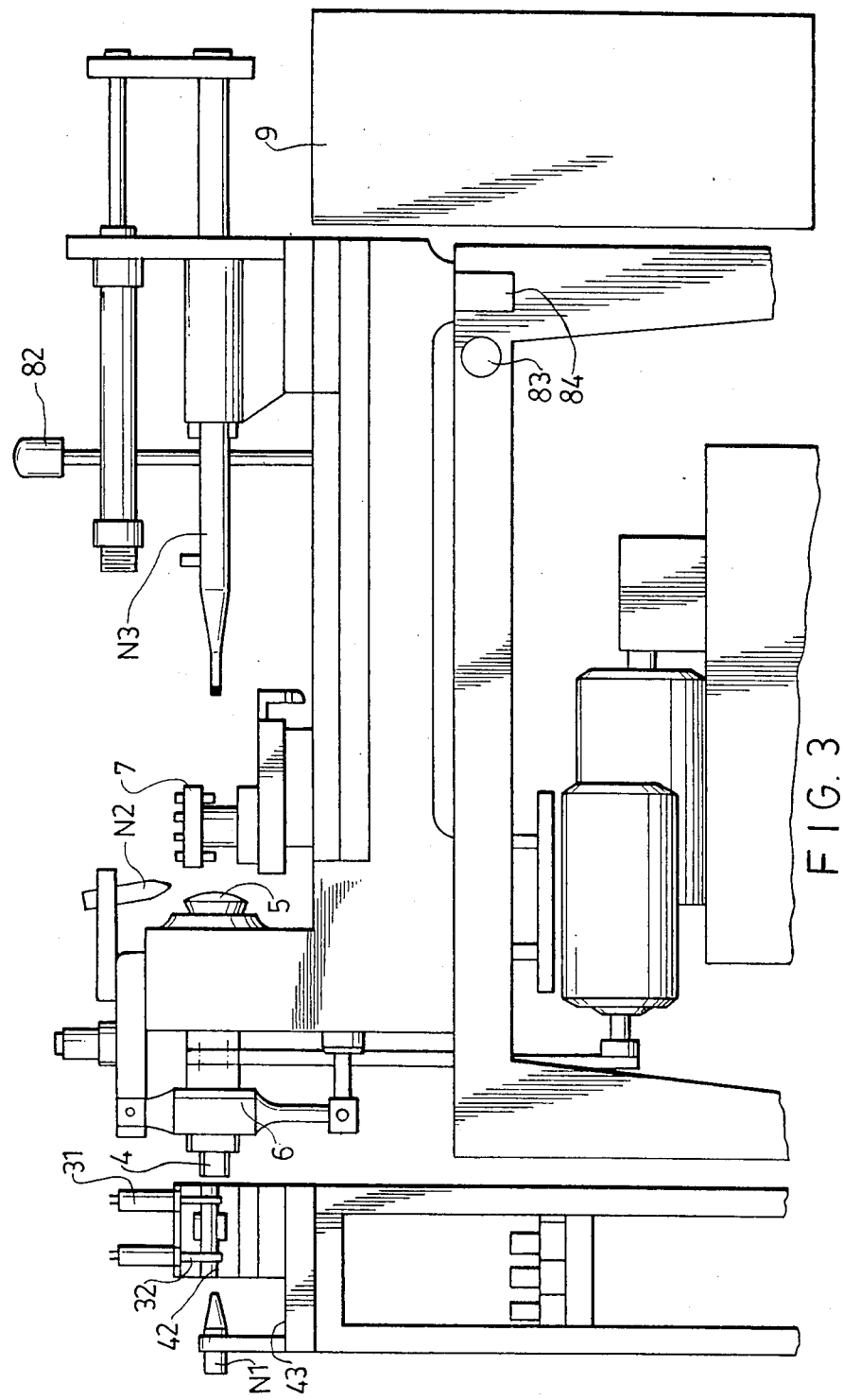
FIG. 3 is a front view showing the portable lathe of the present invention.
Figure 4:
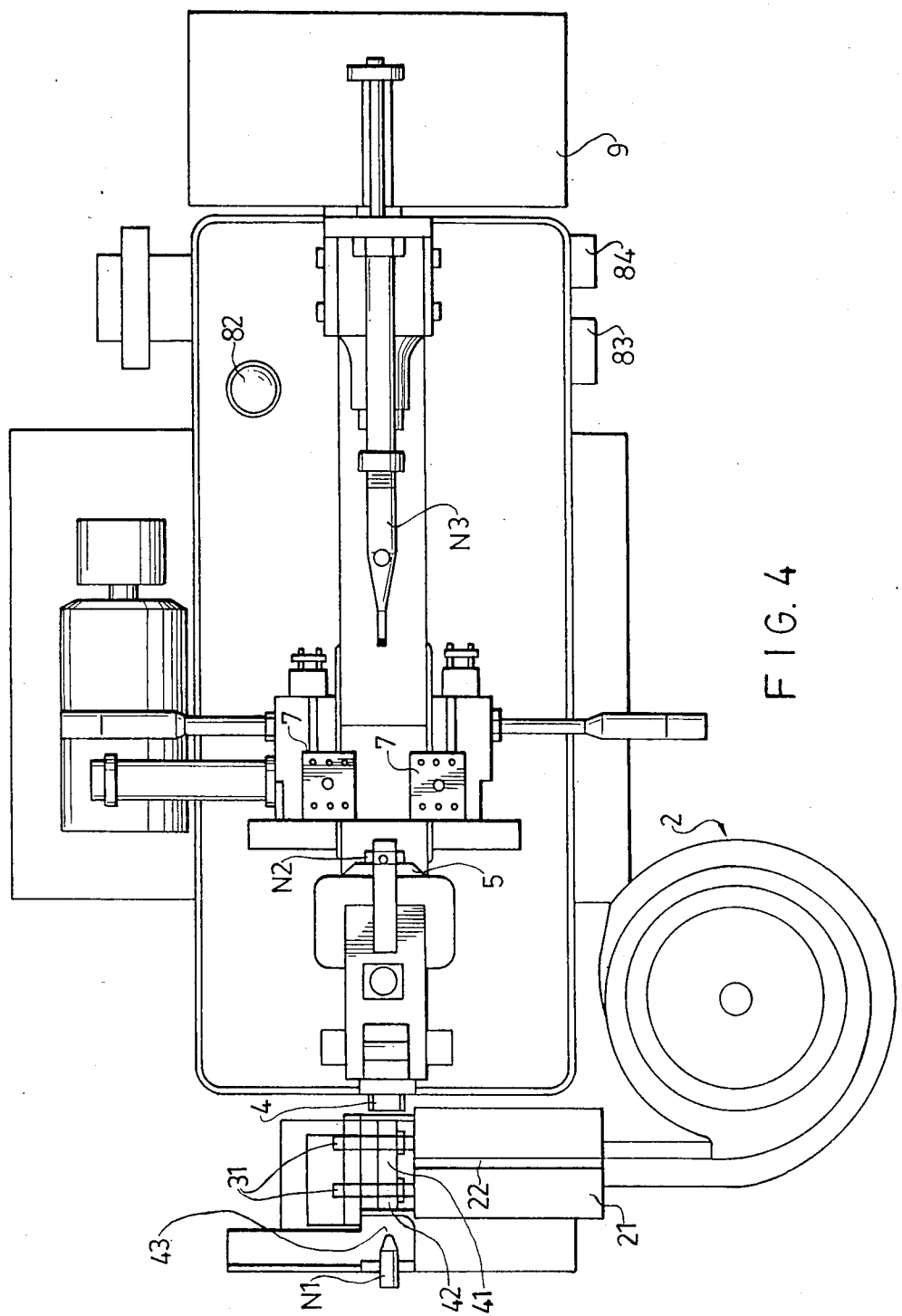
FIG. 4 is a top view showing the portable lathe of the present invention.

Referring to FIG. 1, there is shown a portable lathe of the present invention. According to the method of the present invention, a plurality of workpieces 1, each having an outward flange 11, are fed by a vibratory feeder 2 including an inclined slide plate 21 and a guide slot 22 in a known manner. All of the workpieces 1 are fed to a pneumatic control valve 3 in the same horizontal condition in which the outward flanges 11 of the workpieces 1 are in line with the guide slot 22.

The pneumatic control valve 3 includes two aligned air cylinders 31 each of which has a piston rod 32. The piston rod 32 of the cylinder 31 can be driven to move upwardly, permitting the pneumatic control valve 3 to be opened. After the pneumatic control valve 3 has been opened for a predetermined period, the piston rod 32 is driven to move downwardly permitting the pneumatic control valve 3 to be closed so that only the foremost one of the workpieces 1 can drop onto the inlet 41 of a sliding way 4 during the predetermined period. That is to say, the during machining operation, one workpiece 1 is charged into the sliding way 4 during a time interval. When the workpiece 1 enters the inlet 41 of the sliding way 4, a first air nozzle N1 blows compressed air onto it so as to move the workpiece 1 along the sliding way 4 into a chuck 5. Referring to FIG. 2, the outward flange 11 of the workpiece 1 is then obstructed from forward movement out of the chuck 5.

When the workpiece 1 just reaches the chuck 5, a hydraulic clutch 6 is immediately driven by a hydraulic cylinder 61 to hold the workpiece 1 within and on the chuck 5 and in turn to rotate the workpiece 1. During rotation of the workpiece 1, two cross slides 7 (only one is shown in FIG. 1), each carrying a cutting tool, advance against the workpiece 1 in a known manner to cut the same. In this embodiment, it is noted that the main spindle (not shown) always rotates after starting the feed of the workpieces 1. Thus, so long as the hydraulic clutch 6 is driven to hold the workpiece 1 on the chuck 5, the workpiece 1 will be rotated.

After completely shaping the workpiece 1, a second air nozzle N2 can blow compressed air onto the workpiece 1 so as to remove chips from the workpiece 1. It is understood in the art that spray from the second air nozzle N2 may be the combination of compressed air and an atomized lubricant. Before the workpiece 1 reaches the chuck 5, a third air nozzle N3 is pneumatically moved away from the chuck 5 to the position shown in FIG. 1 so that the third air nozzle N3 is remote from the workpiece 1 when cutting the workpiece 1. After the chips are cleared from the workpiece 1, the third air nozzle N3 is pneumatically moved toward the workpiece 1 to the original position adjacent to the workpiece 1. Then, by driving the hydraulic clutch 6, the workpiece 1 is loosened from the chuck 1.

Finally, the third air nozzle N3 blows compressed air onto the workpiece 1 so as to move the latter along the sliding way 4 to the outlet 42 of the sliding way 4 and in turn to drop into a container 43 disposed just below the first air nozzle N1. Then, the pneumatic control valve 3 is opened again, thereby starting the machining operation of the next workpiece 1.

A sensor 81 is mounted on the vibratory feeder 2 against the pneumatic control valve 3. When the workpieces 1 are completely charged into the sliding way 4, or when the workpieces 1 are not fed to the pneumatic control valve 3 due to the malfunction of the vibratory feeder 2, the sensor 81 will activate an alarming lamp 82 and a buzzer 83 to generate an alarm. It will be understood that this alarm system can deter useless operation of the lathe, thereby avoiding a needless waste of energy consumption.

Also provided is a counter 84 for totalizing and indicating the number of the workpieces 1 which have been machined.

Furthermore, a timer 9 is designed so that the operation of the lathe is performed under a timing control. Because of the automatic control of the timer 9, the lathe is entirely automatic.

It should be noted that a rubber cushion T is mounted on the tip of the third air nozzle N3. When the workpiece is a cylindrical rod on which there is not provided any outward flange, the rubber cushion T can be used to obstruct the cylindrical workpiece so that the latter stops and thus abuts against the rubber cushion T. Certaninly, the third air nozzle N3 is fixed but not moved away from the chuck 5 just before the workpiece reaches the chuck 5, so that the workpiece can be obstructed by the rubber cushion T and thus positioned for cutting. However, when cutting the workpiece, the third air nozzle N3 must be moved away from the workpiece.

With the present invention thus explained, it is apparent that various modifications and variations can be made without departing from the scope and spirit of the present invention. It is therefore intended that the present invention be limited only as indicated in the appended claims.

What is claimed is:

1. A method for automatically cutting workpieces on a portable lathe comprising the steps of:
   (1) automatically feeding said workpieces to a pneumatic control valve one by one in such a manner that all of said workpieces reach said control valve with the same orientation;
   (2) automatically opening said control valve for a predetermined period and subsequently closing said control valve under a timing control so that only the foremost one of said workpieces can enter an inlet of a sliding way during said predetermined period;
   (3) blowing compressed air from a first air nozzle onto said workpiece which has reached said inlet of said sliding way under said timing control so that said workpiece slides along said sliding way into a chuck while said workpiece is obstructed from forward movement out of said chuck;
   (4) automatically holding said workpiece within said chuck under said timing control;
   (5) automatically rotating said chuck and hence said workpiece about a longitudinal axis of said workpiece under said timing control;
   (6) automatically moving a cutting tool relative to said workpiece to cut said workpiece under said timing control;
   (7) automatically blowing compressed air from a second air nozzle onto said workpiece held within said chuck so as to remove chips from said workpiece under said timing control;
   (8) automatically loosening said workpiece from said chuck under said timing control;
   (9) automatically blowing compressed air from a third air nozzle onto said workpiece under said timing control so that said workpiece slides back along said sliding way to an outlet of said sliding way through said inlet of said sliding way; and
   (10) repeating said steps (2) to (9) for the next workpiece.

2. An apparatus for automatically cutting workpieces on a portable lathe comprising:
   a chuck having a plurality of circumferentially spaced adjustable jaws movable radially inwardly to clamp one of said workpieces tightly therebetween;
   a sliding way to said chuck, said sliding way having an inlet and an outlet, said inlet being situated between said chuck and said outlet;
   a pneumatic control valve installed immediately above said inlet of said sliding way;
   a feeder for automatically feeding said workpieces to said pneumatic control valve one by one in such a manner that all of said workpieces reach said pneumatic control valve with the same orientation;

a first air nozzle directed toward said inlet of said sliding way for moving said workpiece along said sliding way into said chuck;

means for obstructing said workpiece within said chuck from forward movement out of said chuck and holding said workpiece to prevent said workpiece from revolving relative to said chuck;

a cutting tool movable relative to said workpiece held in said chuck to cut said workpiece, thereby forming chips from said workpiece;

a second air nozzle directed radially of said workpiece when said workpiece is held within said chuck for removing said chips from said workpiece by blowing compressed air from said second air nozzle toward said workpiece after said workpiece has been cut;

a third air nozzle directed toward said workpiece positioned loosely within said chuck for moving said workpiece to said outlet of said the sliding way; and a timer for timing control of the starting and stopping operation of said first, second, and third air nozzles, said pneumatic control valve, and said chuck;

whereby, said workpieces can be automatically charged into said chuck, automatically held in said chuck, automatically cut by said cutting tool, automatically loosened from said chuck, and automatically discharged from said chuck to said outlet of said sliding way under the timing control of said timer.

3. An apparatus as claimed in claim 2, further comprising a container disposed just below said outlet of said sliding way for receiving said workpieces dropped from said outlet of said sliding way.

4. An apparatus as claimed in claim 2, wherein said pneumatic control valve includes a pair of aligned air cylinders each having a piston rod movable to permit said workpiece to pass therethrough under the timing control of said timer.

5. An apparatus as claimed in claim 2, wherein said third air nozzle is capable of being moved toward and away from said workpiece held within said chuck under the timing control of said timer.

6. An apparatus as claimed in claim 2, further comprising:

an alarming device; and a sensor, disposed against said feeder, responsive to absence of said workpiece by activating said alarming device to generate an alarm;

whereby, when said workpieces are not fed, said alarming device can signal for either stopping the operation of said lathe or recharging additional workpieces through said feeder into said sliding way.

7. An apparatus as claimed in claim 2, further comprising a counter mounted on said lathe for indicating the number of said workpieces which have been machined.

8. An apparatus as claimed in claim 2, wherein said means for obstructing said workpiece within said chuck from forward movement out of the latter includes a rubber cushion mounted on a tip of said third air nozzle, whereby, when said workpiece is blown by said first air nozzle to encounter said rubber cushion, said workpiece will be stopped.

* * * * *